United States Patent
Le Leannec et al.

(10) Patent No.: US 8,942,286 B2
(45) Date of Patent: Jan. 27, 2015

(54) VIDEO CODING USING TWO MULTIPLE VALUES

(75) Inventors: Fabrice Le Leannec, Mouaze (FR); Patrice Onno, Rennes (FR); Xavier Henocq, Melesse (FR)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 12/632,875

(22) Filed: Dec. 8, 2009

(65) Prior Publication Data

US 2010/0142622 A1    Jun. 10, 2010

(30) Foreign Application Priority Data

Dec. 9, 2008   (FR) ...................................... 08 58395

(51) Int. Cl.
| H04N 11/02 | (2006.01) |
| H04N 19/115 | (2014.01) |
| H04N 19/187 | (2014.01) |
| H04N 19/147 | (2014.01) |
| H04N 19/19 | (2014.01) |

(52) U.S. Cl.
CPC ..... H04N 19/00321 (2013.01); H04N 19/0006 (2013.01); H04N 19/00175 (2013.01); H04N 19/00351 (2013.01)
USPC .................................................. 375/240.16

(58) Field of Classification Search
USPC ........................... 375/240.01, 240.16, 240.26
See application file for complete search history.

(56) References Cited

U.S. PATENT DOCUMENTS

| 6,501,860 B1 | 12/2002 | Charrier et al. ............... 382/240 |
| 6,891,895 B1 | 5/2005 | Onno et al. .................... 375/260 |
| 7,113,643 B2 | 9/2006 | Le Leannec et al. ......... 382/235 |
| 7,190,838 B2 | 3/2007 | Le Leannec et al. ......... 382/233 |
| 7,212,678 B2 | 5/2007 | Brown et al. .................. 382/240 |
| 7,260,264 B2 | 8/2007 | Guillou et al. ................. 382/232 |
| 7,281,033 B2 | 10/2007 | Le Leannec et al. ......... 709/217 |
| 7,382,923 B2 | 6/2008 | Onno ............................ 382/233 |
| 7,453,937 B2 | 11/2008 | Henocq et al. ........... 375/240.03 |
| 7,466,865 B2 | 12/2008 | Henocq et al. ............... 382/239 |
| 7,499,546 B2 | 3/2009 | Donescu et al. .............. 380/217 |
| 7,512,819 B2 | 3/2009 | Uehara ......................... 713/320 |
| 7,571,316 B2 | 8/2009 | Onno et al. ................... 713/160 |
| 7,580,578 B1 | 8/2009 | Onno et al. ................... 382/232 |
| 2002/0071485 A1* | 6/2002 | Caglar et al. ............. 375/240.01 |
| 2004/0068587 A1 | 4/2004 | Le Leannec et al. ......... 709/247 |
| 2005/0226334 A1* | 10/2005 | Han ......................... 375/240.16 |
| 2006/0083309 A1* | 4/2006 | Schwarz et al. ......... 375/240.16 |

(Continued)

OTHER PUBLICATIONS

Schwarz, H., et al., "Further Results for an rd-Optimized Multi-Loop SVC Encoder", Joint Video Team (JVT), Doc. No. JVT-W071, Apr. 18, 2007.

(Continued)

*Primary Examiner* — Dave Czekaj
*Assistant Examiner* — Leron Beck
(74) *Attorney, Agent, or Firm* — Fitzpatrick, Cella, Harper & Scinto

(57) ABSTRACT

Video coding in which at least two bandwidth values are obtained. A base layer is coded so that a rate of the coded base layer data is less than or equal to the lowest bandwidth. For at least one bandwidth greater than the lowest bandwidth, at least one enhancement layer is coded so that the sum of a rate of the data of the coded enhancement layer and a rate of a subset of data of a reference layer serving as a reference for interlayer prediction of the enhancement layer is less than the bandwidth greater than the lowest bandwidth.

17 Claims, 10 Drawing Sheets

(56) References Cited

U.S. PATENT DOCUMENTS

Figure 1:
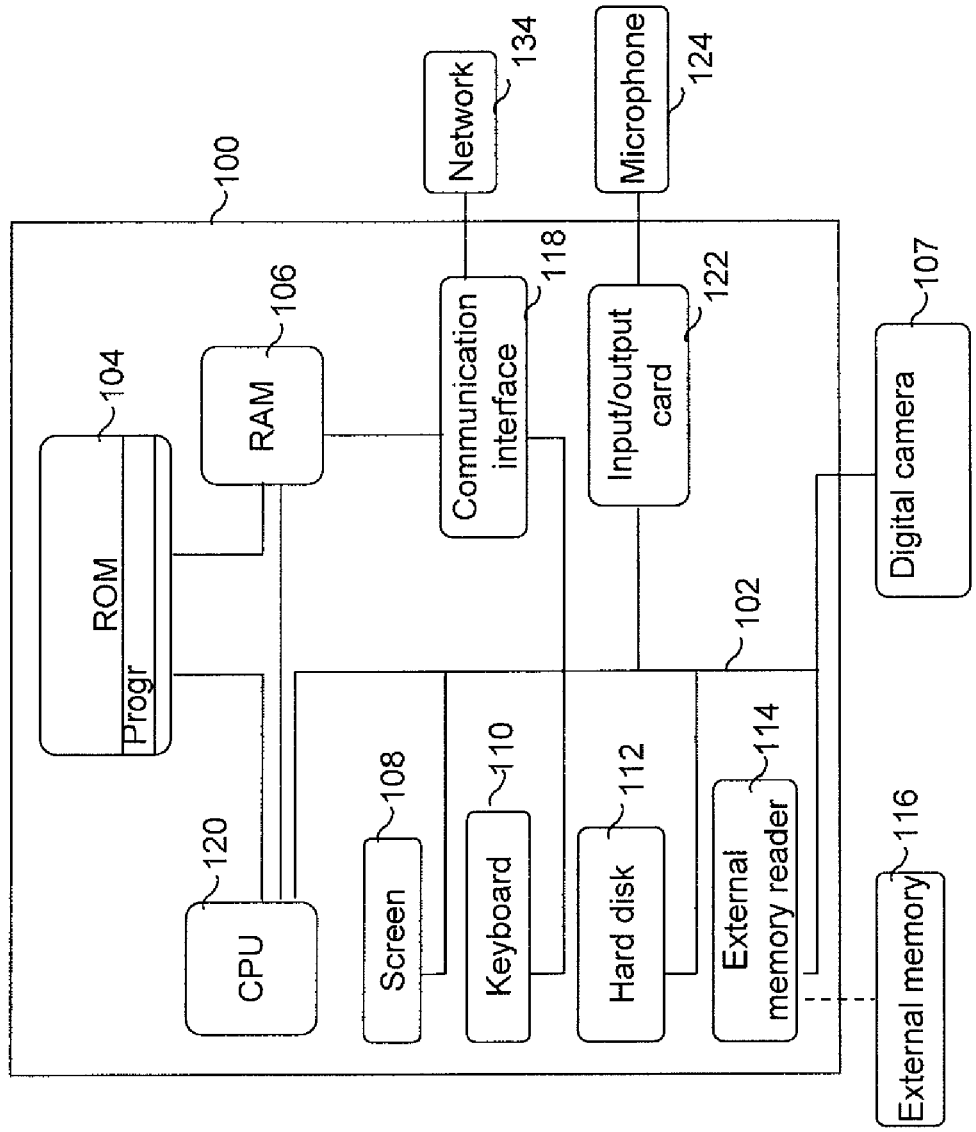

| | | | |
|---|---|---|---|
| 2007/0019721 A1 | 1/2007 | Le Leannec et al. | 375/240.1 |
| 2007/0127576 A1 | 6/2007 | Henocq et al. | 375/240.16 |
| 2007/0195880 A1 | 8/2007 | Henocq et al. | 375/240.13 |
| 2007/0201549 A1* | 8/2007 | Hannuksela et al. | 375/240.01 |
| 2007/0216699 A1 | 9/2007 | Le Leannec et al. | 345/555 |
| 2007/0223033 A1 | 9/2007 | Onno et al. | 358/1.15 |
| 2007/0286508 A1 | 12/2007 | Le Leannec et al. | 382/240 |
| 2008/0025399 A1 | 1/2008 | Le Leannec et al. | 375/240.16 |
| 2008/0075170 A1 | 3/2008 | Henocq et al. | 375/240.16 |
| 2008/0095231 A1 | 4/2008 | Onno et al. | 375/240.12 |
| 2008/0130736 A1 | 6/2008 | Onno et al. | 375/240.01 |
| 2008/0131011 A1 | 6/2008 | Le Leannec et al. | 382/238 |
| 2008/0144725 A1 | 6/2008 | Henocq et al. | 375/240.27 |
| 2009/0016433 A1 | 1/2009 | Henocq et al. | 375/240.01 |
| 2009/0122865 A1 | 5/2009 | Henocq et al. | 375/240.12 |
| 2009/0278956 A1 | 11/2009 | Le Leannec et al. | 348/222.1 |
| 2009/0290648 A1 | 11/2009 | Onno et al. | 375/240.27 |
| 2009/0310674 A1 | 12/2009 | Le Leannec et al. | 375/240.12 |
| 2010/0053398 A1 | 3/2010 | Yamashita | 348/302 |
| 2010/0158134 A1* | 6/2010 | Yin et al. | 375/240.26 |

OTHER PUBLICATIONS

Reichel, J., et al., "Joint Scalable Video Model JSVM-12 text", Joint Video Team (JVT) (ISO/IEC JTC1/SC29/WG11 and ITU-T SG16 1.6) No. JVT-Y202, Oct. 2007.

Int'l Telecomm. Union "Advanced Video Coding for Generic Audiovisual Services" ITU-T Recommendation H.264, Nov. 2007.

Mathew, M., et al., "Discardable bits and Multi-layer RD estimation for Single loop decoding", Joint Video Team (JVT) of ISO/IEC MPEG & ITU-T VCEG (ISO/IEC JTC1/SC29/WG11 and ITU-T SG16 Q6), JVT-R050, Jan. 15, 2006, pp. 1-10.

Amonou, I., et al., "Splitting Inter Layer Prediction Information", Joint Video Team (JVT) of ISO/IEC MPEG & ITU-T VCEG (ISO/IEC JTC1/SC29/WG11 and ITU-T SG16 Q6), No. JVT-T052, Jul. 15, 2006, pp. 1-11.

Schwarz, H., et al., "Independent parsing of spatial and CGS layers", Joint Video Team (JVT) of ISO/IEC MPEG & ITU-T VCEG (ISO/IEC JTC1/SC29/WG11 and ITU-T SG16 Q6), No. JVT-S069, Mar. 31, 2006, pp. 1-20.

Schwarz, H., et al., "Overview of the Scalable Extension of the H.264/MPEG-4 AVC Video Coding Standard", Joint Video Team (JVT) of ISO/IEC MPEG & ITU-T VCEG (ISO/IEC JTC1/SC29/WG11 and ITU-T SG16 Q6), No. JVT-U145, Oct. 20, 2006.

Reichel, J., et al., "Joint Scalable Video Model JSVM 1", Joint Video Team (JVT) of ISO/IEC MPEG & ITU-T VCEG (ISO/IEC JTC1/SC29/WG11 and ITU-T SG16 Q6), No. JVT-N021, Jan. 2005, section 4.3.

* cited by examiner

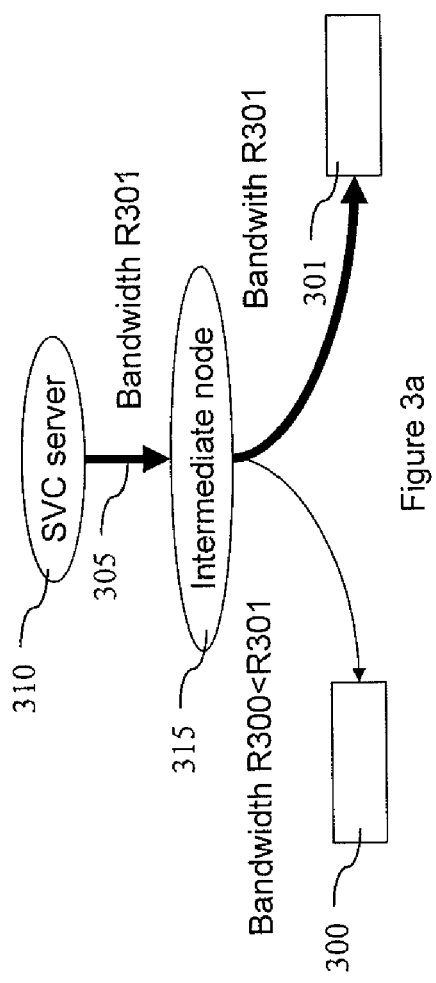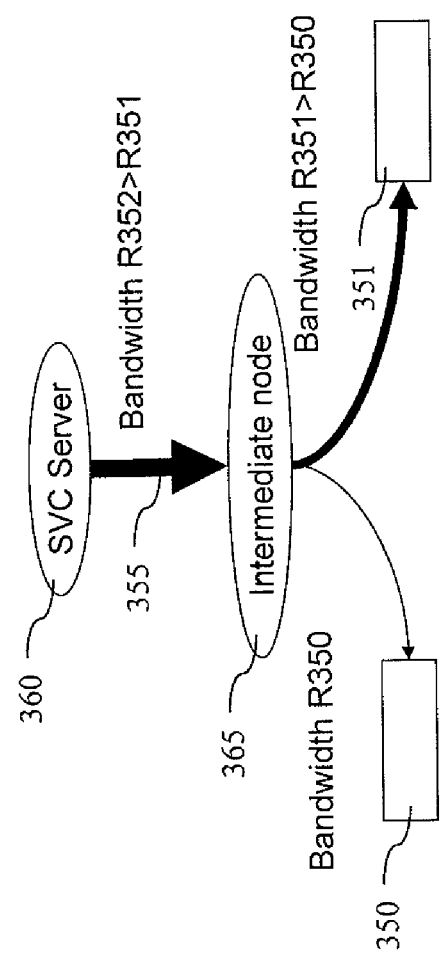

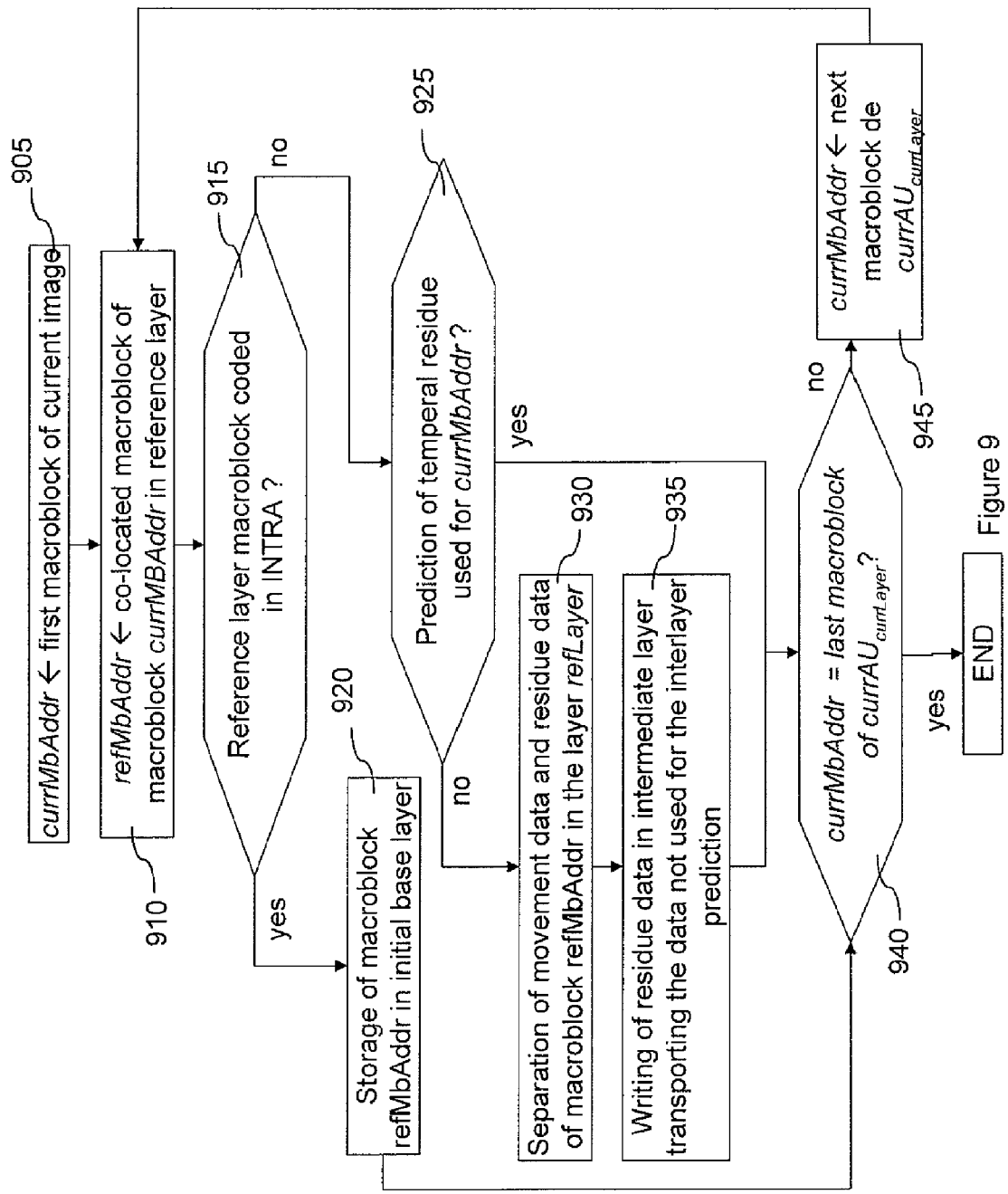

VIDEO CODING USING TWO MULTIPLE VALUES

The present invention concerns a video coding method and device. It applies in particular to multicast video coding in accordance with the SVC (the acronym for "Scalable Video Coding") standard, and more precisely concerns optimization of the coding modes for coding SVC enhancement layers.

The SVC video compression standard affords an extension to the H.264/AVC (the acronym for "Advanced Video Coding") standard, consisting of a hierarchical or scalable video compression system compatible with the initial H.264/AVC standard. Spatial, temporal and quality scalability functionalities are supplied by the SVC standard.

Temporal scalability is supplied by the hierarchical B images. Concerning spatial scalability or quality scalability (improvement of the signal to noise ratio), an SVC video stream contains an H.264/AVC compatible base layer, and one or more enhancement layers, spatial or quality, referred to as SNR (the acronym for "Signal to Noise Ratio"), can be coded on top of this base layer. The problem at the basis of the present invention concerns the process of choosing coding modes in the spatial or SNR SVC enhancement layers.

When the H.264/AVC base layer is coded, the SVC coder attempts to choose the coding modes for each macroblock providing the best performance in terms of rate/distortion. For example, this choice of coding mode takes the form of a Lagrangian providing the best compromise between the cost in terms of rate and the reconstruction distortion of each macroblock in each image.

Likewise, during the coding of an SVC enhancement layer, the coder attempts to find the best coding modes for each macroblock of each image, using a Lagrangian optimization similar to that employed for the base layer. This optimization aims to adjust the compromise between the reconstruction distortion of the current macroblock on the one hand, and the cost in terms of rate related to the coding of the current macroblock in the enhancement layer on the other hand. The difference with the mode decision process in the base layer relates to the additional coding modes being evaluated in the enhancement layer. These additional coding modes use interlayer prediction mechanisms particular to SVC.

The technical contribution to the JVT (the acronym for "Joint Video Team") committee JVT-W071 by H Schwarz and T Wiegand "Further results for an rd-optimized multi-loop SVC encoder" (Technical Report JVT-W071, Fraunhofer HHI, 23$^{rd}$ JVT Meeting, San Jose, Calif. April 2007) proposes a method for the Lagrangian optimization of coding mode choice modified compared with that of the JSVM (the acronym for "Joint Scalable Video Model" designating the SVC reference software). This method modifies the choice of coding mode in the base layer, so as to choose the coding modes for the base layer that optimize the coding of the enhancement layer on top of the base layer. The objective of this method is to code the base layer in a way that then maximizes the use of the interlayer prediction in the coding of the enhancement layer.

However, these coding methods are not optimized, in particular for the adaptation of the coding of the various layers with respect to a plurality of possible rates for transmission over a network.

The present invention aims to remedy these drawbacks.

To this end, according to a first aspect, the present invention relates to a video coding method that comprises:

a step of obtaining at least two bandwidth values;
a step of coding a base layer so that the rate of the data of the base layer coded is less than or equal to the lowest bandwidth; and
for at least one bandwidth greater than the lowest bandwidth, at least a step of coding an enhancement layer so that the sum of the rate of the data of said coded enhancement layer and the rate of the data serving as a reference for a reference layer of said enhancement layer is less than said bandwidth.

The present invention thus supplies an optimization of the coding modes of the macroblocks of an SVC enhancement layer, which improves the performance of the algorithm used in the JSVM, in particular in the context of a multicast transmission or with a view to a deferred transmission to a single client on a communication network able to use a plurality of bandwidths. Implementation of the present invention also affords an improvement to the performance of the JSVM in the applicative context of a point to point transmission of pre-encoded SVC video streams, where scalability is used as a rate regulation means.

In addition, the technical results supplied by the present invention mean that the rate cost associated with the coded data of the reference layer useful for the interlayer prediction of the layer currently being coded is taken into account in the choice of decoding modes of the current layer. Optimization of the coding mode of this enhancement layer is therefore more effective.

According to particular characteristics, during the step of obtaining at least two bandwidth values, bandwidth values received by at least two coded video data destinations are obtained. The present invention thus applies to the broadcasting of video data in multicast mode on a network.

According to particular characteristics, at least one step of coding an enhancement layer depends on the bandwidth of a link of a network shared by said destinations.

Thus video coding scalable in real time, assumed to be adapted to multicast transmission applications, takes account of the topology of the network used. Knowledge of the bandwidths available on at least one of the links in the network improves the optimization of the rates for the various enhancement layers.

During at least one step of coding an enhancement layer, the distortion in reconstruction of the images is minimized whilst meeting the following two constraints:

the sum of the enhancement data during coding and the rate of the data used for the interlayer prediction is less than or equal to the bandwidth received by a destination, and
the rate of all the coded data, including the data unnecessary for the interlayer prediction, the data used for the interlayer prediction and the coded data in said enhancement layer, is less than or equal to the bandwidth of the link of the network shared by the destinations.

Thus all the data transmitted are useful while complying with constraints relating to the network, and best using the bandwidth or bandwidths available on the network.

According to particular characteristics, at least one step of coding an enhancement layer comprises a separation step during which:

in the coded data of the reference layer, the coded data that is not used for the interlayer prediction and the data that is used for the interlayer prediction are separated:
the coded data that is not used for the interlayer prediction is inserted in a so-called "intermediate" layer, and
the data that is used for the interlayer prediction is kept in the reference layer.

This is because discriminating the data of the base layer which is not used for the interlayer prediction makes it possible to reduce the transmission rates of the base layer and enhancement layer from a server to a client.

In addition, because of this separation, there is no need to recode the data of the reference layer, which limits the resources necessary for determining the data of the reference layer useful for the interlayer prediction of an enhancement layer.

According to particular characteristics, during the separation step, the temporal residues are separated when they do not serve as a predictor for the interlayer residue prediction and are inserted in the intermediate layer.

According to particular characteristics, during the separation step, the following are kept in the reference layer:
  the motion data comprising macroblock partitioning data,
  the reference data of indices of reference images for the temporal prediction,
  the motion vector data, and
  the macroblocks coded in INTRA.

According to particular characteristics, during the separation step, information indicating that the macroblocks contained in said intermediate layer inherit coded motion data in the reference layer are added to said intermediate layer.

According to particular characteristics, during the separation step, said intermediate layer is marked as discardable and the coded data of the enhancement layer contain an indication that the reference layer of the enhancement layer is the reference layer after separation of the data in order to form the intermediate layer.

According to particular characteristics, during the separation step, for each macroblock of the current layer, if the corresponding macroblock for the interlayer prediction, in the reference layer, has been coded in INTRA it is kept in the reference layer.

According to particular characteristics, during the separation step, if said macroblock of the reference layer has not been coded in INTRA and the temporal residue interlayer prediction is used in the coding of said macroblock of the current layer, the coded data of said macroblock is kept in the reference layer.

According to particular characteristics, during the separation step, if said macroblock of the reference layer has not been coded in INTRA and the temporal residue interlayer prediction is not used in the coding of said macroblock of the current layer, the coded data of said macroblock are inserted in the intermediate layer.

By virtue of each of these provisions, the separation is both simple and effective. In addition, marking the intermediate layer as discardable makes the method that is the object of the present invention compatible with existing video decoders.

According to particular characteristics, during at least one step of coding an enhancement layer, a Lagrangian of the form $J=D+\lambda \times R$, where D represents the reconstruction distortion, R represents the rate of the reference data used for the interlayer prediction and $\lambda$ represents a rate-distortion slope that is a function of the rate.

According to particular characteristics, the method that is the object of the present invention, as succinctly disclosed above, comprises a step of calculating the rate of the reference data used for the interlayer prediction, in which account is taken of the total rate of the reference data used for the prediction of the current macroblock of the enhancement layer during coding according to a candidate coding parameter for the minimization of said Lagrangian.

According to a second aspect, the present invention relates to a video coding device that comprises:

a means of obtaining at least two bandwidth values;
  a means of coding a base layer so that the rate of the data of the base layer coded is less than or equal to the lowest bandwidth;
  a coding means adapted, for at least one bandwidth greater than the lowest bandwidth, to code an enhancement layer so that the sum of the rate of the data of said coded enhancement layer and the rate of the data serving as a reference of a reference layer of said enhancement layer is less than said bandwidth.

According to a third aspect, the present invention relates to a computer program that can be loaded into a computer system, said program containing instructions for implementing the method that is the object of the present invention, as succinctly disclosed above.

According to a fourth aspect, the present invention relates to an information carrier that can be read by a computer or micro-processor, removable or not, storing instructions of a computer program, characterized in that it allows the implementation of the method that is the object of the present invention, as succinctly disclosed above.

The advantages, aims and characteristics of this video coding device, this computer program and this information carrier being similar to those of the method that is the object of the present invention, as succinctly disclosed above, are not repeated here.

Figure 2:
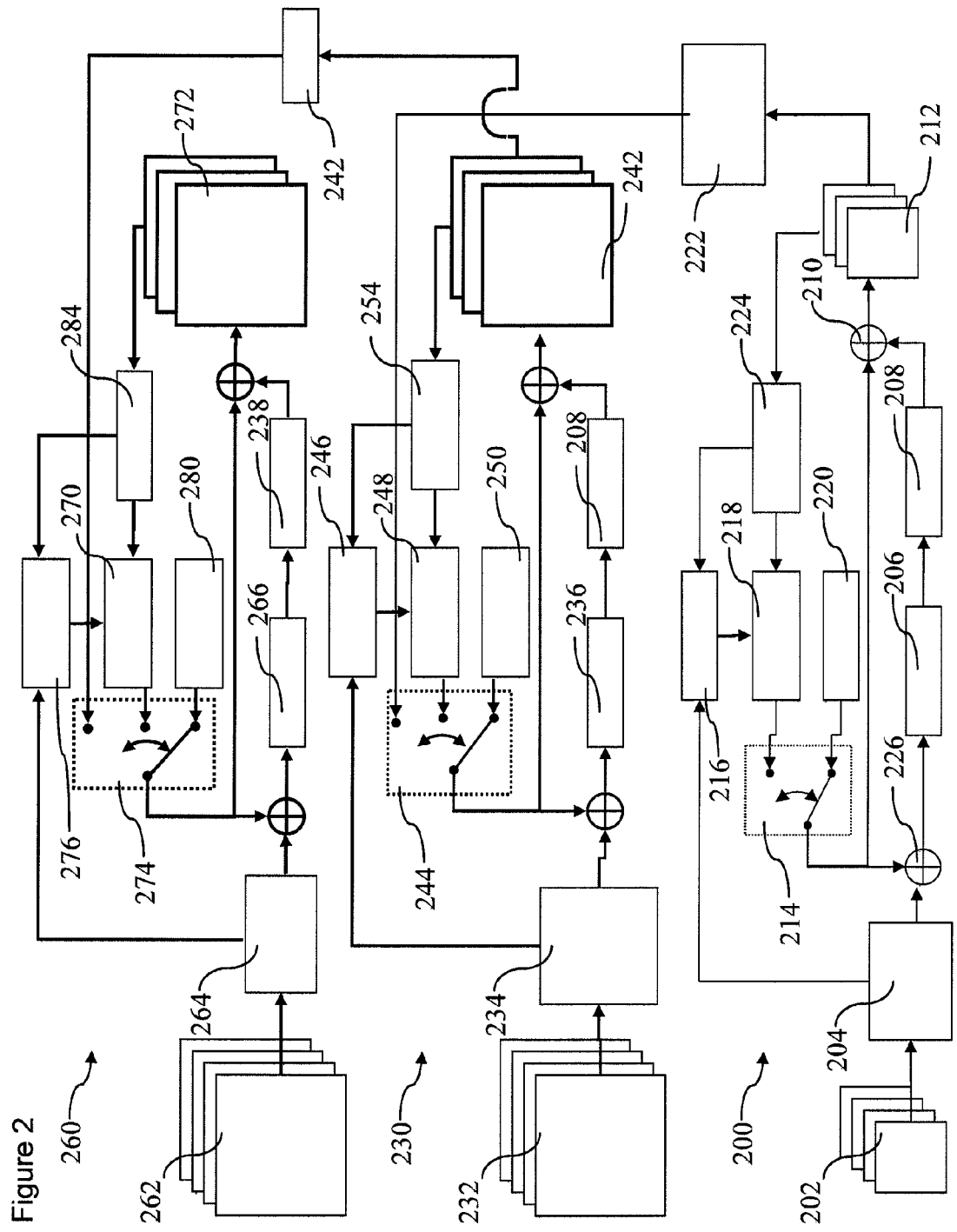
Figures 3C, 4C:
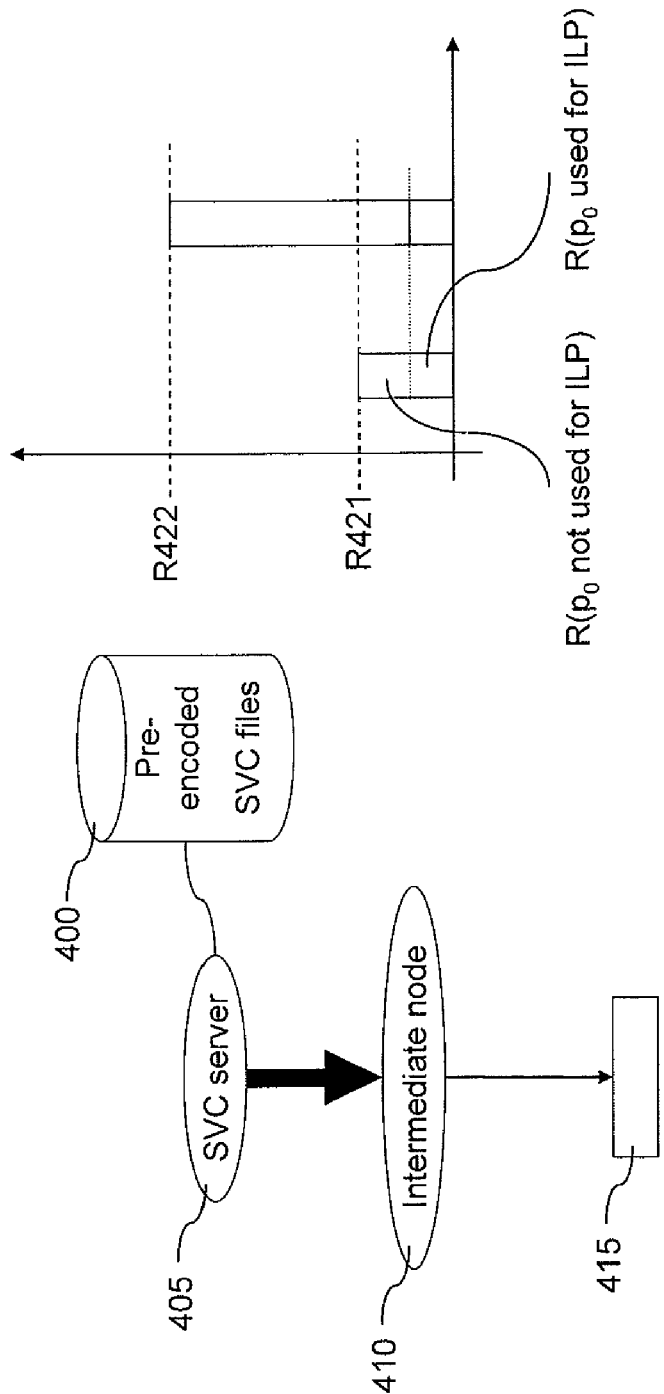
Figures 4A, 4B:
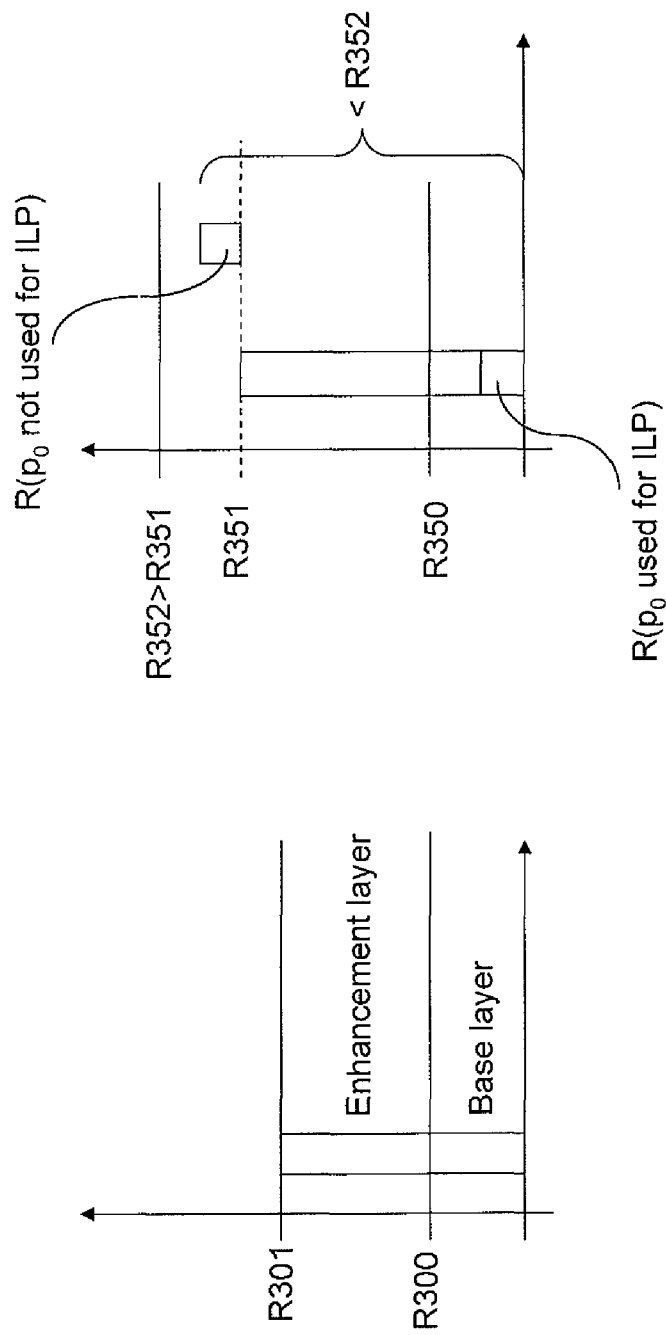

Other advantages, aims and characteristics of the present invention will emerge from the following description given, for explanatory purposes and in no way limitatively, with regard to the accompanying drawings in which:

FIG. 1 depicts schematically a particular embodiment of the video coding device that is the object to the present invention, FIG. 2 depicts a functional block diagram of a coding device of the prior art, FIGS. 3a to 3c depicts schematically video data streams broadcast in multicast mode, FIGS. 4a to 4c depict schematically rates of coding layers for the video data streams illustrated in FIGS. 3a to 3c, FIG. 5 depicts schematically a principle of partitioning a reference coding layer into distinct scalability layers, and FIGS. 6 to 9 depict, in the form of flow diagrams, steps implemented in a particular embodiment of the method that is the object of the present invention.

In the following description, the terms "improvement" or "enhancement" are used indifferently to qualify the layers on top of the base layers.

It can be observed, in FIG. 1, that, in a particular embodiment, the device that is the object of the present invention takes the form of a microcomputer 100 provided with software implementing the method that is the object of the present invention and various peripherals. The device consists here of a server adapted to transmit coded images to destinations or "clients" (not shown).

The microcomputer 100 is connected to various peripherals, for example an image acquisition or storage means 107, for example a digital camera or a scanner, connected to a graphics card (not shown) and supplying imagine information to be coded and transmitted. The microcomputer 100 comprises a communication interface 118 connected to a network 134 able to receive digital data to be coded and to transmit data coded by the microcomputer. The microcomputer 100 also comprises a storage means of the mass memory type 112 such as, for example, a hard disk. The microcomputer 100 also comprises an external memory reader 114. An external mass memory or "key" comprising a memory (for example a so-called USB key by reference to its communication port) 116, like the storage means 112, may contain data to be processed. The external memory 116 may also contain instructions of software implementing the method that is the object of the present invention, instructions which, once read by the microcomputer 100, are stored in the storage means 112. According to a variant, the program Progr enabling the device to implement the present invention is stored in read only memory 104 (referred to as ROM, the acronym for read only memory, in FIG. 1), which is also a mass memory. In a second variant, the program is received by means of the communication network 134 and is stored in the storage means 112. The microcomputer 100 is connected to a microphone 124 by means of the input/output card 122. The microcomputer 100 has a screen 108 for displaying the data to be coded or serving as an interface with the user, by means of a keyboard 110 or any other means (a mouse for example).

Naturally the external memory 116 can be replaced by any information carrier such as a CD-ROM (the acronym for compact disc-read only memory) or a memory card. In more general terms, an information storage means, able to be read by a computer or a microprocessor, integrated or not in the device, possibly removable, stores a program implementing the method that is the object of the present invention.

A central unit 120 (referred to as a CPU, the acronym for central processing unit, in FIG. 1) executes the instructions of the software implementing the method that is the object of the present invention. On powering up, the programs for implementing the method that is the object of the present invention stored in a non-volatile memory, for example the ROM 104, are transferred into the random access memory RAM 106, which then contains the instructions of this software as well as registers for storing the variables necessary for implementing the invention.

The communication bus 102 affords communication between the various elements of the microcomputer 100 or connected to it. The representation of the bus 102 is not limitative. In particular the central unit 120 is able to communicate instructions to any element of the device directly or by means of another element of the device.

FIG. 2 provides a block diagram of an SVC video coder generating three scalability layers. This diagram is organized in three stages 200, 230 and 260, respectively dedicated to the coding of each of the scalability layers generated. The numerical references of similar functions are incremented by 30 between the successive stages. Each stage takes, as an input, the original sequence of images to be compressed, respectively 202, 232 and 262, possibly subsampled at the spatial resolution of the scalability layer coded by the stage in question (the case of the first stage 202 coding the base layer, at the bottom in FIG. 2). Within each stage a motion-compensated temporal prediction loop is implemented.

The first stage 200 in FIG. 2 corresponds to the temporal and spatial prediction diagram of an H.264/AVC non-scalable video coder and is known to persons skilled in the art. It successfully performs the following steps for coding the H.264/AVC-compatible base layer. A current image 202 to be compressed at the input to the coder is divided into macroblocks of size 16×16 pixels, by the function 204. Each macroblock first of all undergoes a motion estimation step, function 216, which attempts to find, among reference images stored in a buffer 212, reference blocks for best predicting the current macroblock. This motion estimation function 216 supplies one or two indices of reference images containing the reference blocks found, as well as the corresponding motion vectors. A motion compensation function 218 applies the estimated motion vectors to the reference blocks found and copies the blocks thus obtained into a temporal prediction image. In addition, an INTRA prediction function 220 determines the spatial prediction mode of the current macroblock that would provide the best performance for the coding of the current macroblock in INTRA mode. Next a function of choosing the coding mode 214 determines, among the temporal and spatial predictions, the coding mode that provides the best rate to distortion compromise in the coding of the current macroblock. The difference between the current macroblock and the prediction macroblock thus selected is calculated by the function 226, so as to provide a residue (temporal or spatial) to be compressed. This residual macroblock then undergoes discreet cosine transformation (or DCT) and quantization functions 206. An entropic coding of the samples thus quantized is then performed, by a function not shown in FIG. 2, and supplies the compressed texture data of the current macroblock.

Finally, the current macroblock is reconstructed by means of a reverse quantization and reverse transformation 208, and an addition 210 of the residue after reverse transformation and the prediction macroblock of the current macroblock. Once the current image is thus reconstructed, this is stored in a buffer 212 in order to serve as a reference for the temporal prediction of future images to be coded.

Functions 222 and 224 perform a filtering operation known to persons skilled in the art by the term deblocking filter and aimed at reducing the block effects that may appear at the boundary of macroblocks.

The second stage in FIG. 2 illustrates the coding of the first enhancement layer 230 of the SVC stream. This layer 230 affords an enhancement in terms of spatial resolution compared with the base layer 200. The coding scheme of this layer is also known to persons skilled in the art. As indicated by FIG. 2, it is similar to the coding scheme of the base layer, except that, for each macroblock of a current image in the course of compression, an additional prediction mode with respect to the coding of the base layer may be chosen by the coding mode selection function 244. This prediction mode is called "interlayer prediction". It consists of reusing the coded data in a layer below the enhancement layer currently being coded as prediction data of the current macroblock. This bottom layer, here the base layer 200, is called the "reference layer" for the interlayer prediction of the enhancement layer 230.

In the case where the reference layer contains an image that coincides in time with the current image, then referred to as the "base image" of the current image, the colocated macroblock, that is to say the one that has the same spatial position as the current macroblock that was coded in the base layer, may serve as a reference for predicting the current macroblock. More precisely, the coding mode, the macroblock partitioning, the motion data (if present) and the texture data (residue in the case of a temporally predicted macroblock, reconstructed texture in the case of a macroblock coded in INTRA) of the colocated macroblock can be used to predict the current macroblock. In the case of a spatial enhancement layer, operations (not shown) of supersampling of texture and motion data of the reference layer are performed. Apart from this technique of interlayer prediction used in the SVC extension of the H.264/AVC standard, the coding of an SVC scalability layer uses a motion-compensated temporal prediction loop similar to the one used for coding the H.264/AVC-compatible base layer 200.

Finally, as indicated in FIG. 2, the coding of a third layer 262 (the second enhancement layer) uses a coding scheme identical to that of the first enhancement layer 230, the reference layer then being the first enhancement layer.

In the SVC reference coder, documented in the document by J Reichel, H Schwarz and M Wien "Joint Scalable Video Model JSVM-12 text" (ISO/IEC JTC1/SC29/WG11 and ITU-T SG16 1.6, Shenzen, China, October 2007. Document JVT JVT-Y202), the function of choosing coding modes in the SVC enhancement layers (244 and 274 in FIG. 2) attempts to choose the coding modes that give the best rate-distortion performance. To do this, the coder evaluates the distortion and rate associated with the coding of a macroblock in each candidate coding mode. The estimated distortion corresponds to the distortion between the original macroblock that it is sought to compress and the macroblock reconstructed by means of the decoding of the enhancement data of the layer in question. In addition, the rate cost that is taken into account for evaluating each candidate coding mode corresponds to the rate cost of the macroblocks processed in the scalability layer currently being coded. Consequently account is not taken of the rate costs of the data of the bottom layers that serve to predict the macroblock of the current layer, according to the coding modes that use interlayer prediction mechanisms.

In addition, it may be advantageous, in some SVC transmission contexts, to separate the data of the bottom layers that serve as a reference for the interlayer prediction and the data of these bottom layers that are not used in the interlayer prediction. Thus, when the SVC stream is transmitted at a given quality or spatial resolution level, it is not possible to transmit only the data actually used for the decoding of the sequence at the scalability level aimed at. Not transmitting the data that is not used for decoding (typically the coded data of the bottom layers not used as a reference for predicting the top layers) offers a reduction in the transmission rate and therefore improvement to the rate/distortion performance of the transmission process.

Thus, in particular embodiments of the present invention, a choice of coding mode in the SVC enhancement layers is made, adapted to any SVC transmission applicative context where the separation of the data of the bottom layers aimed at pruning the data unnecessary for the interlayer prediction can be envisaged. The algorithm described with regard to FIGS. 5 to 9 aims at improving the performance obtained with the process of selecting modes of the SVC reference coder in such an applicative context.

FIGS. 3a and 3b illustrate two different applicative contexts, leading potentially to different SVC video coding strategies.

FIG. 3a illustrates an SVC multicast transmission scenario from a server to two different clients (300 and 301). In the case of FIG. 3a, the client 301 has a greater bandwidth than the client 300. In addition, these two clients 300 and 301 share a network link 305 in common, between an SVC server 310 and an intermediate mode 315, the bandwidth capacity of which is equal to the bandwidth R301 available at the client 301. In this case, all the coded SVC data are transmitted together over the common link 305 of bandwidth R301. Consequently the SCV coding must attempt to generate an SVC stream comprising two scalability layers: a base layer complying with the rate constraint R0 and an enhancement layer such that the two layers together comply with the maximum rate constraint R301. For this purpose, in order to obtain the best possible rate distortion performance for the enhancement layer, it is desirable for a minimum amount of redundancy to exist between the two coded layers and therefore for the enhancement layer to reuse a maximum amount of coded information in the base layer, by means of the interlayer prediction mechanisms particular to the SVC standard.

In this context, the coding strategy, and more particularly the optimization of the coding modes, employed in the SVC reference coder, seems to be suitable.

FIG. 3b illustrates a second case of application, similar to the first, except that the network link 355 shared by two clients 350 and 351, situated between a server 360 and an intermediate router 365, has a bandwidth capacity R352 greater than each of the bandwidths R350 and R351 available to the clients 350 and 351. In this case, the rate constraints that the SVC stream transmitted must comply with are as follows: the substreams received by the clients 350 and 351 must have a respective rate less than or equal to R350 and R351 while the two streams together transmitted by the server must comply with the rate constraint R352. It is therefore not necessary for the SVC stream to be coded in a fully scalable fashion. Data of the top layer may possibly be coded in a non-hierarchical fashion without using the interlayer prediction if this proves more efficient for coding the top layer with the best possible quality. In this case, there would then exist redundancy between the base layer and the top layer. This redundancy can be eliminated by not transmitting the data of the base layer that would not serve to predict the top layer to the client 351. This is possible by separating the base layer into two sets of coded data: a first set containing the data useful to the interlayer prediction and a second set containing the data not used for the interlayer prediction. Thus it is possible to transmit to the client 351 only part of the base layer in addition to the top layer. Such an implementation then makes it possible to optimize the quality of the video sequence received by the client 351 without modifying the rate/distortion performance of the SVC substream received by the client 350.

The embodiment of the method that is the object of the present invention described with regard to FIGS. 5 to 9 supplies a coding strategy for an SVC enhancement layer that takes into account the possibility of discriminating the data of the base layer and that takes into account a rate constraint for each representation level of the SVC sequence, as well as a global rate constraint for the entire SVC stream to be generated.

FIGS. 4a and 4b supply an illustration of the optimization problem that it is sought to resolve when an SVC stream respectively adapted to the applicative contexts introduced with regard to FIGS. 3a and 3b is coded. With regard to the first applicative case, FIG. 4a shows the rate constraints imposed on the respective coding of two SVC scalability layers. The rate constraint R300 must be complied with by the base layer while the rate constraint R301 must be complied with by the two layers together. The optimization problem to be resolved in this case is as follows:

the coding of the base layer attempts to minimize the reconstruction distortion of the base layer under the rate constraint R300. In other words it is sought to resolve the following optimization problem:

$$\text{Min}_{P_0}[D(p_0)]$$

$$R(p_0) \leq R300 \tag{1}$$

where $p_0$ represents all the coding modes of the base layer, $D(p_0)$ represents the reconstruction distortion of the base layer, and $R(p_0)$ represents the rate of the coded base layer, next the optimization of the coding of the enhancement layer consists of seeking the coding parameters $p_1$ of the enhancement layer that satisfy the following equation:

$$\min_{p_1}[D(p_1|p_0)]$$

$$R(p_1/p_0) \leq R301 - R300 \tag{2}$$

where $D(p_1|p_0)$ represents the reconstruction distortion of the sequence at the higher scalability level, and $R(p_1|p_0)$ represents the coding cost of the enhancement layer, if the sets of coding parameters $p_0$ and $p_1$ have respectively been selected for the base layer and the enhancement layer.

It should be noted that the two optimization steps indicated above, adapted to the applicative case of FIGS. 3a and 4a, correspond to the optimization strategy for the coding modes as implemented in the SVC reference coder. The rate-distortion optimization of the coding modes that are performed therein is in particular documented in the document by J Reichel, H Schwarz, and M Wein. "Joint Scalable Video Model JSVM1. Joint Video Team of ISO/IEC MPEG and ITU-T-VCEG, Hong Kong, China, January 2005. Document JVT-NO21".

Concerning the second applicative case, illustrated by FIGS. 3b and 4b and corresponding to the practical case described with regard to FIGS. 5 to 9, the problem of optimization of the coding modes that it involves can be formulated as follows. The base layer must be coded so as to comply with rate constraint R350. In addition, the enhancement layer must be coded so that the two coded layers together comply with rate restraint R352 and the rate of the data to be transmitted for decoding the stream at the hierarchical level (corresponding to the enhancement layer) complies with rate constraint R351. Formally, this can be expressed as follows:

The coding of the base layer attempts to minimize the distortion in reconstruction of the base layer under rate constraint R350. In other words it is sought to resolve the following optimization problem:

$$\min_{P_0}[D(p_0)]$$

$$R(p_0) \leq R350 \qquad (3)$$

The optimization problem for the base layer is that identical to the previous case represented by equation (1).

Next, the optimization of the coding of the enhancement layer consists of seeking the coding parameters $p_1$ of the enhancement layer that satisfy the following equation:

$$\mathrm{Min}_{P_1}[D(p_1|p_0)]$$

$$R(p_1)+R(p_0) \leq R352$$

$$R(p_1)+R(p_0 \text{ used for ILP}) \leq R351 \qquad (4)$$

where $R(p_0 \text{ used for ILP})$ represents the rate of the subset of the coded data in the base layer that serve as a reference for predicting data of the enhancement layer, in the context of the interlayer prediction of SVC enhancement data. This supposes that it is possible to separate the base layer into two distinct SVC substeams, one containing the data useful in the interlayer prediction of the top layer and the other containing data not used in the interlayer prediction. This is possible, as explained below, with reference to FIG. 5. Finally, it should be noted that the problem of optimization of equation (4) can be written in the following modified form:

$$p_1 = \min p_1[D(p_1|p_0)]$$

$$R(p_1)+R(p_0 \text{ used for ILP}) \leq R351$$

$$R(p_0 \text{ not used for ILP}) \leq R352 - R351 \qquad (5)$$

where $R(p_0 \text{ not used for ILP})$ represents the rate cost of the data of the base layer not used for the interlayer prediction of the enhancement layer.

FIG. 3c illustrates the second applicative scenario in which the invention can advantageously be used. This case of application corresponds to the transmission, by means of a network node 410, point to point from a single server 405 to a single client 415, of pre-encoded scalable SVC video sequences. As illustrated in FIG. 3c, such pre-encoded sequences are stored at the server in a storage space 400. When the client 415 connects to the server 405 and requests the transmission of an SVC sequence, the server 405 determines, according to the bandwidth available on the transmission network and possibly other characteristics such as the decoding capacity of the client 415, the rate at which the required sequence must be transmitted. The server 405 then extracts, from the pre-encoded stored SVC stream, a subset of scalability layers whose rate complies with the transmission rate decided on. Thus, at the time of coding the video sequences stored in the server 405, the rate or rates at which these sequences will be transmitted over the network are not yet known. It is then decided on a set of possible rates for the extraction of SVC substreams during this prior coding. FIG. 4c provides the example of two values of rates R421 and R422 at which it is decided to code two scalability layers. The sequence thus coded with two scalability layers can then be transmitted at these two rates R421 and R422 by the server. This case, in the same way as in the case illustrated in FIG. 4b, the coding of the base layer attempts to optimize the choice of the coding modes, in the rate-distortion sense, while complying with the rate constraint R421 applied to this base layer.

Next, the coding of the enhancement layer consists of optimizing the choices of coding modes in the enhancement layer so that all the data to be decoded (and therefore to be transmitted) in order to restore the enhancement layer, complies with rate constraint R422. To do this, the server 405 optimizes the coding modes in the enhancement layer by attempting to minimize the decoding distortion of the enhancement layer. In addition, the rate constraint R422 is taken into account in order to ensure that the sum of the rates of the data of the enhancement layer and the only data of the base layer used for the interlayer prediction of the enhancement layer is less than or equal to R422. Provision is therefore made, in a similar fashion to the case illustrated in FIG. 4b, for separating the data of the base layer that serve for the interlayer prediction of the enhancement layer and the data of the base layer that are not used as a reference in the interlayer prediction.

Thus, during the point to point transmission envisaged in FIG. 3c, if the server 405 decides to transmit the two scalability layers to the client 415, the entire enhancement layer and a portion of the base layer denoted "$R(p_0$ used for ILP)" are transmitted to the client 415. The data of the base layer unnecessary for the interlayer prediction, denoted "$R(p_0$ not used for ILP)" in FIG. 4c, are not transmitted by the server 405 in this case.

Figure 5:
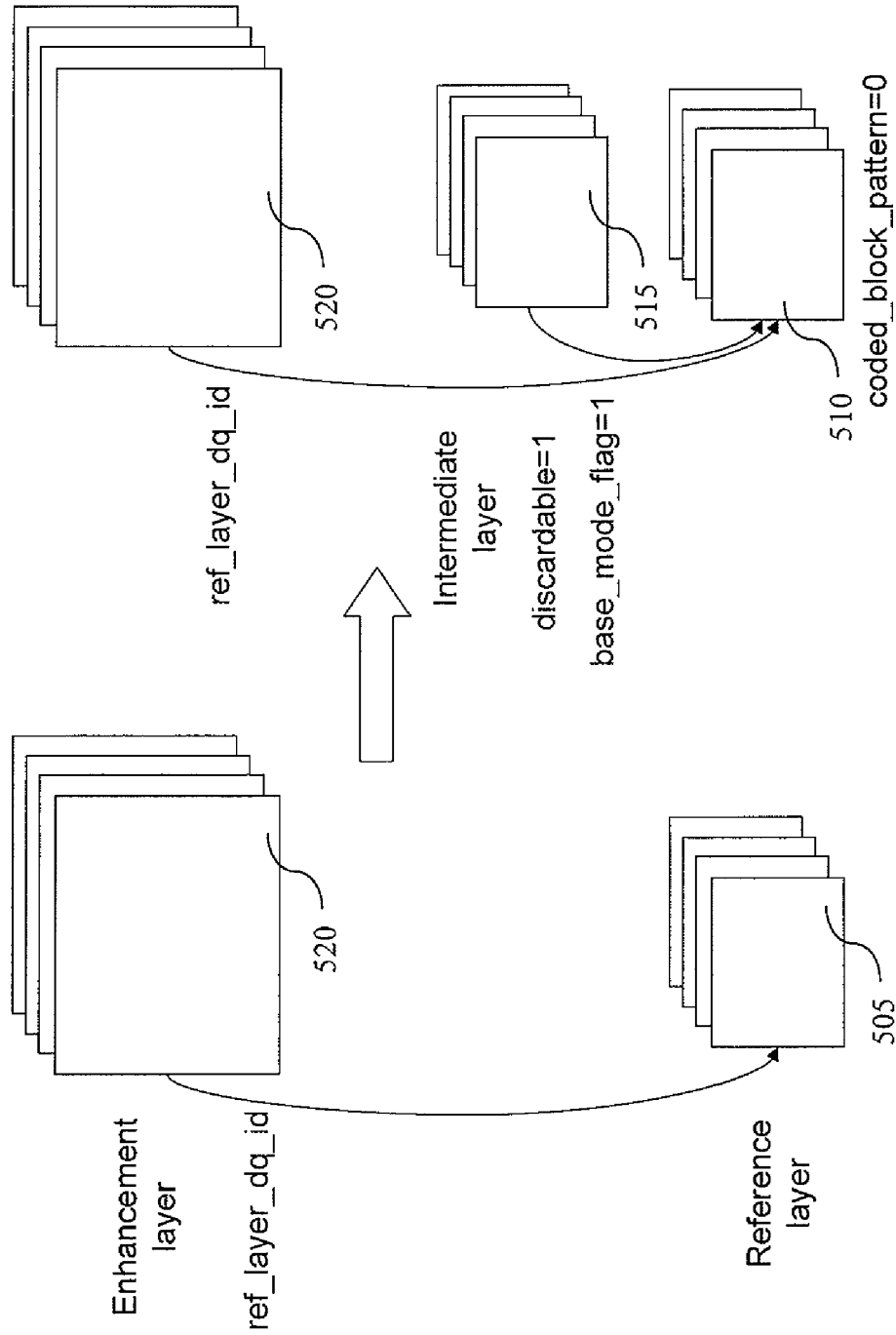

FIG. 5 illustrates how to divide a scalability layer 505 of an SVC stream by separating the data 510 that serve as a reference for the interlayer prediction of a top layer and the data 515 that do not serve as a reference. Several approaches are known to persons skilled in the art.

A description is given here of a solution based on the separation method proposed in the document by I Amonou, N Cammas, S Kervadec and S Pateux "Splitting interlayer prediction information" (Technical Report JVT-T052, Orange—France Telecom R&D Division, 20th JVT Meeting, Klagenfurt, Austria, July 2006), which has the advantage of being simple and not requiring recoding of the layer that it is sought to divide, according to the choices of interlayer prediction modes made in the predicted layer. However, the present invention is not limited to this particular separation method, and any other method, using scalability layers or not, could be used in the context of the present invention.

The preferential separation method employed is as follows. The motion data (partitioning of macroblocks, reference of indices of reference images for the temporal prediction, motion vectors) and the macroblocks coded in INTRA are maintained intact coded in the initial base layer 510. In addition, the temporal residues, when they are not used as a predictor for the residue interlayer prediction, are moved into a scalability layer 515, referred to as the "intermediate layer", inserted between the initial base layer 510 and the predicted top layer 520.

For the macroblocks concerned, the indicator coded block pattern (see the International Telecommunication Union document "Advanced video coding for generic audiovisual services" ITU-T Recommendation H.264, November 2007 available at the address http://www.itu.int/rec/T-REC-H.264-200711-1/en), sections 7.3.5, 7.4.5, G.7.3.6 and G.7.4.6 is set to "0" so as to indicate that no non-zero quantized DCT coefficient is coded for the macroblocks in question in the base layer.

Next, in the intermediate layer 515 inserted to contain the data not used for the interlayer prediction of the top layer, the SVC syntax element "base_mode_flag" of the corresponding macroblocks is set to "1", indicating that these macroblocks inherit motion data already coded in the reference layer. In addition, the temporal residue removed from the reference layer is coded in the intermediate layer 515 intended to transport those data that will not serve to predict the top layer. The macroblocks that were coded in INTRA in the base layer and that are left unchanged therein are not coded or enhanced in the intermediate layer 515. Finally, this intermediate layer is marked as "discardable" by means of the field "discardable_flag" positioned at "1", indicating that this intermediate scalability layer 515 is not used for the prediction of the top layer. Finally, in the headers of the coded slices (which are subsets of successive macroblocks of an image) of the top layer 520, the syntax element "ref_layer_dq_id" is written so as to indicate that the reference of the top layer is the lowest layer 510 for the interlayer prediction.

It should be noted that the technical means employed here for separating the data of the reference layer is such that some data kept in the reference layer 510 (INTRA macroblocks or motion data) may not be used for predicting the top layer 520. Nevertheless, practice shows that the data least used for the interlayer prediction are the temporal residues. In addition, the method employed here requires no recoding of the base layer 510 but consists just of moving the coded syntax elements in intermediate layer 515.

Alternatively, groups of slices are used for separating useful and non-useful macroblocks. The groups of slices partition the macroblocks of an image into at least two distinct sets. The groups of slices are coded strictly independently of one another. They may contain any set of macroblocks.

In the case where groups of slices are used to separate the macroblocks that are useful and the macroblocks that are not useful in the interlayer prediction, it is necessary to recode the base layer so as to eliminate the dependencies between macroblocks in different groups of slices, in terms of spatial prediction of the INTRA macroblocks and the motion vectors of the INTER macroblocks (predicted temporally).

Figure 6:
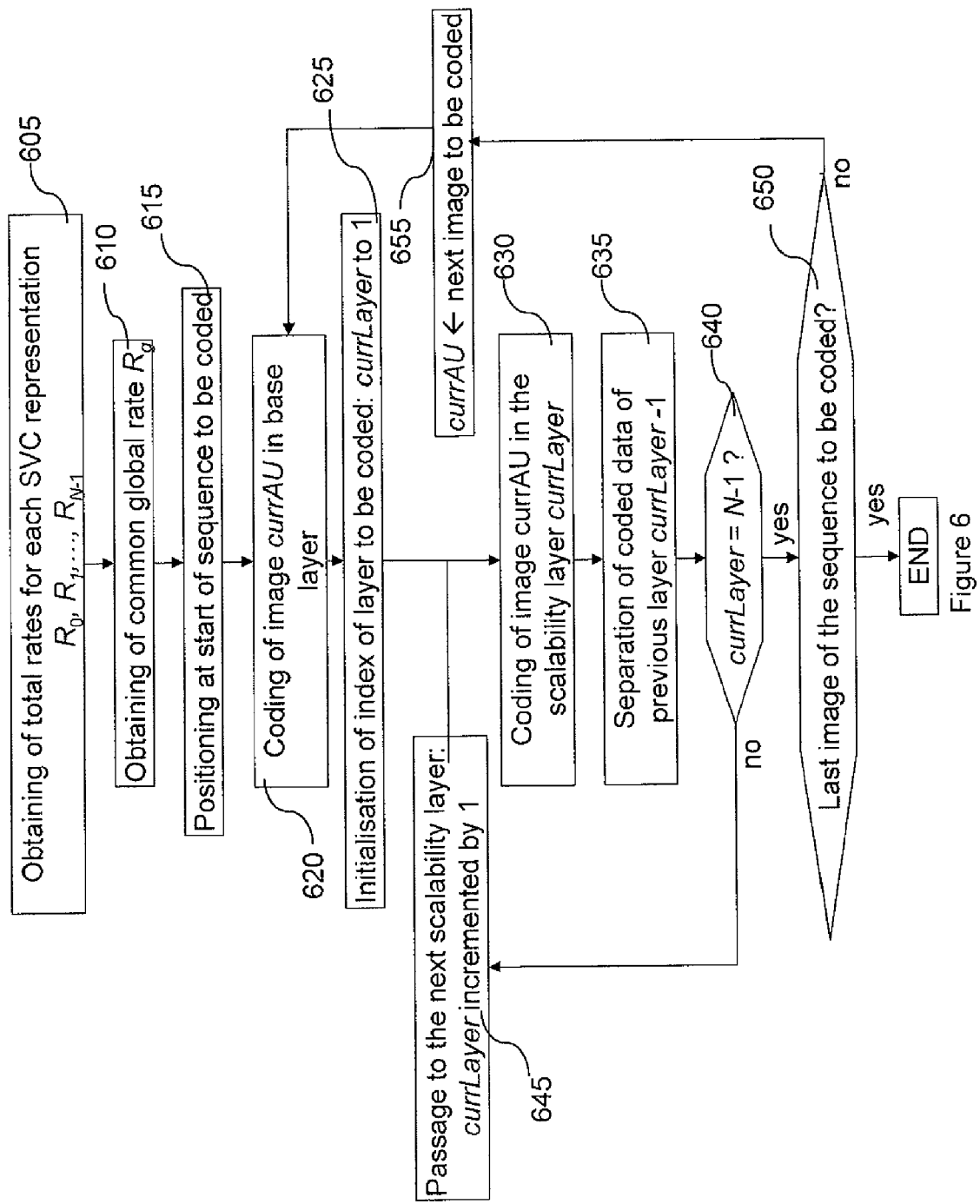

FIG. 6 supplies a global algorithm for coding a multilayer SVC sequence in accordance with the present invention.

The inputs of this algorithm are as follows:
the sequence of original images to be compressed, and
the different bandwidths available on the multicast network envisaged.

The algorithm begins with a step 605 of obtaining the different rates at which it is wished to code each SVC scalability representation level. Where a small number of bandwidths are supplied at the input of the algorithm, the various rates of the layers to be coded can be fixed equal to the different bandwidth values supplied as an input. The algorithm then codes as many SVC scalability layers as there are bandwidths supplied as inputs.

In a variant, where a server delivers the SVC sequence to a large number of clients, it is sought to determine a reduced set of bandwidths representing the different classes of bandwidths present on the network in question. For example, a classification algorithm is used, adapted to determine a reduced set of bandwidths, each corresponding to a class of bandwidths received by a significant number of receivers.

The lowest values of rates supplied by this first step are ordered in increasing order, and are denoted $R_0, \ldots R_{N-1}$ with $R_0 < R_1 < \ldots < R_{N-1}$ where N represents the number of scalability layers coded by the algorithm illustrated in FIG. 6.

During a step 610, the global bandwidth of the common network link shared by all the multicast clients, if such exists, is obtained. If such a link exists, then it is denoted $R_g$. The present invention applies to the applicative cases where $R_g > R_{N-1}$, as is typically the case when a first router, possibly able to truncate an SVC scalable stream, is situated between the server and the various multicast clients. Such a practical case is illustrated in FIG. 3b.

Then, during a step 615, a position is taken at the first image to be coded in the original sequence supplied as an input. Next the base layer is coded for the current image during a step 620. In FIG. 6, the current image is denoted "currAU", standing for "current Access Unit". An access unit, or SVC access unit, corresponds to all the coded data contributing to the decoding of one and the same reconstructed image of an SVC sequence. During the step 620 of coding the base layer, the contribution of the base layer to the current access unit currAU is coded.

Figure 7:
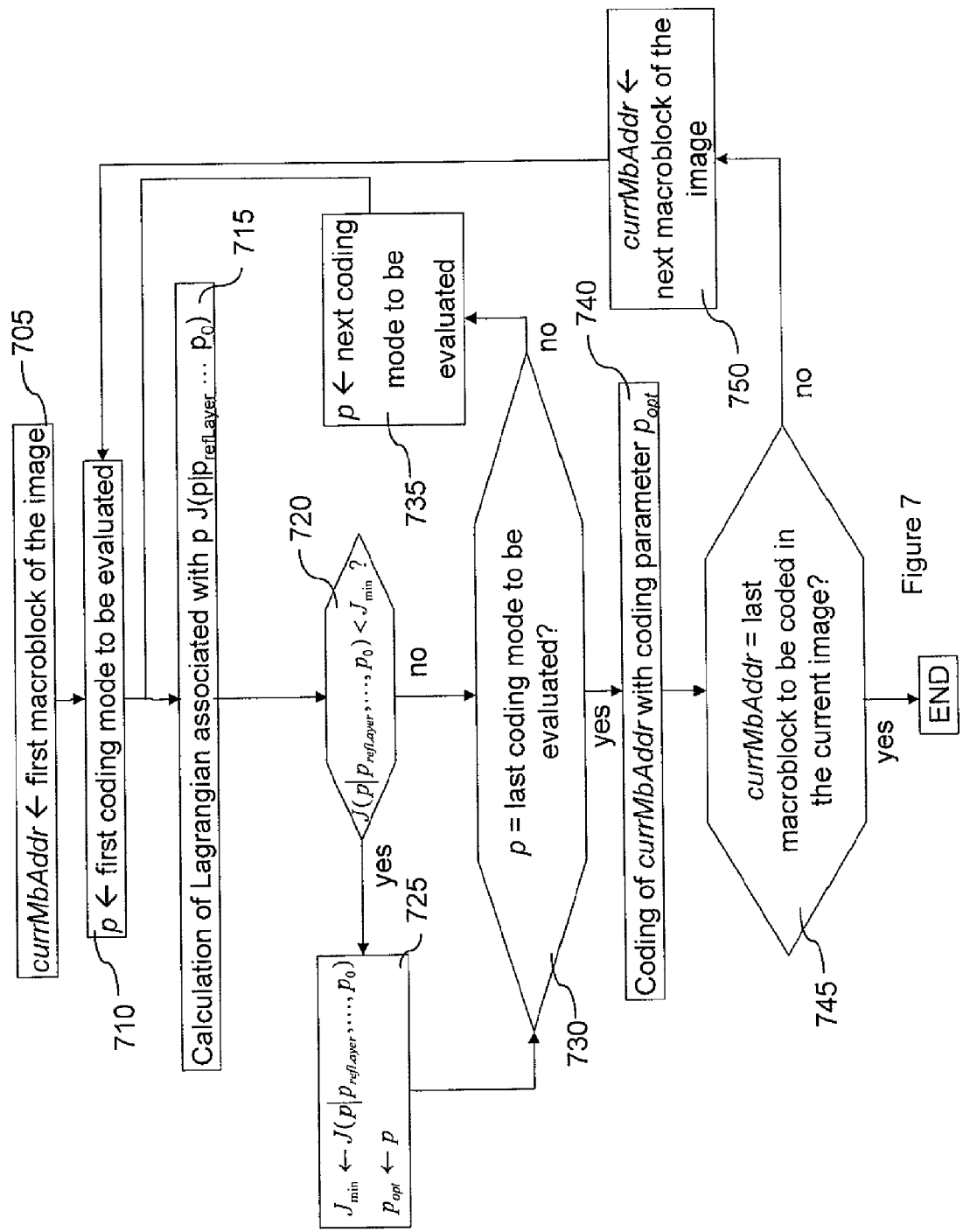

Then, with a step 625, the successive scalability layers are coded on top of the base layer for the current access until currAU. For this purpose, an index currLayer of the layer to be coded is initialized to the value "1" during a step 625. A loop comprising steps 630 to 645 is then run through over all the SVC enhancement layers to be coded for the current image. For each successively processed enhancement layer, a step 630 of coding the layer in question, detailed with regard to FIG. 7, is invoked. This step 630 also implements a procedure for choosing the coding mode specific to the present invention. It is followed by a step 635 of separating the data of the layer already coded, which serves as a reference for predicting the current layer. This separation is made for different coding modes chosen in the current layer in the current image during the preceding coding step 630. Step 635 is detailed with regard to FIG. 9.

During the step 640, it is determined whether the last layer has been coded. If not, the value of currLayer is incremented during a step 645, and step 630 is returned to. Once all the required scalability layers have been coded for the current access unit, it is determined during a step 650 whether an image remains to be coded. If yes, during a step 655, the value currAU is incremented and step 620 is returned to, that is to say the coding of the following image is passed to. The algorithm in FIG. 6 ends when all the images in the input sequence have been coded.

FIG. 7 illustrates an algorithm for coding a given image in the given SVC enhancement layer. The inputs of the algorithm are as follows:
the image to be coded currAU,
the scalability layer currLayer to be coded for the current image, the reference layer used for predicting the current layer: refLayer, and the coded data of the scalability layers already coded, from the base layer as far as the layer of index refLayer.

The algorithm performs a loop comprising steps 710 to 750 on the successive macroblocks of the current image to be coded. For each macroblock of index currMbAddr of the current image, the various possible coding modes for the current macroblock are evaluated successively. Such a candidate coding mode is denoted p. The list of the various possible coding modes, for each type of SVC slice, is supplied in tables 7-11, 7-13, 7-14 and G-4 of the document "Advanced video coding for generic audiovisual services" mentioned above.

During step 710, the first coding mode is considered and is associated with p. For each candidate coding mode p, the macroblock is coded and decoded according to the coding mode p. Next, during a step 715, a Lagrangian modified with respect to the one employed in the coding of the enhancement layers in the reference coder is calculated.

This is because the theory of the distortion rate states that the problem of optimization of equations (1) to (5) can be resolved by minimizing a Lagrangian of the form $J=D+\lambda \times R$, where D represents the reconstruction distortion, R represents the rate and $\lambda$ represents a rate-distortion slope that it is necessary to adjust as a function of the rate constraint fixed for the coding in question. Thus, in the JSVM, the successive optimizations made for the various layers to be coded are as follows:

base layer:

$$p_0 = \mathrm{Argmin}_{p_0}[D_0(p_0) + \lambda_0 \cdot R_0(p_0)] \quad (6)$$

enhancement layer of index currLayer>0:

$$p = \mathrm{Arg}_{p|p_{refLayer} \ldots p_0}\mathrm{Min}[D_{currLayer}(p|p_{refLayer} \ldots p_0) + \lambda_{currLayer} \cdot R(p|p_{refLayer} \ldots p_0))] \quad (7)$$

The Lagrangian multiplier $\lambda_i$ for each layer of index i is fixed according to the quantization parameter used for the current image of the current layer (see the document by J Reichel, H Schwarz and M Wien "Joint Scalable Video Model JSVM 1". Joint Video Team of ISO/IEC MPEG and ITU-T VCEG, Hong Kong, China, January 2005. Document JVT-NO21). This quantization parameter is determined so as to regulate the rate of the various scalability layers and to make it as close as possible to the rate constraint associated with each layer. The determination of the quantization parameters for regulating the rate is not detailed here since it is well known to persons skilled in the art. Thus the minimization of the above Lagrangian makes it possible to find the coding parameters (coding mode, partitioning, index of reference image or images and motion vector or vectors in the case of temporally predicted macroblocks) that minimize the distortion for a rate constraint corresponding to the parameter $\lambda_{currLayer}$.

The drawback of the method of optimizing the mode choices corresponding to equation (7) is that, in the applicative case shown in FIGS. 3b and 4b, the rate for the coded data in the layers below the current layer and used possibly for predicting the current layer is not taken into account.

This is why a modified formulation of equation (7) is used by the algorithm in FIG. 7:

$$p = \mathrm{Argmin}[J(p|p_{refLayer} \ldots p_0)] \quad (8)$$

$$J(p|p_{refLayer} \ldots p_0) = D(p|p_{refLayer} \ldots p_0) + \lambda_{currLayer} \cdot [R(p|p_{refLayer} \ldots p_0) + \Sigma_{k=0}^{refLayer} R(p_k \text{ used})] \quad (9)$$

formulae in which:

refLayer represents the reference layer.

$\lambda_{currLayer}$ represents a rate-distortion slope for the enhancement layer currently being coded, $R(p_k$ used) represents the rate of the reference data of the layer of index k used for the prediction of the current macroblock of the enhancement layer currently being coded.

$D(p|p_{refLayer} \ldots p_0)$ represents the reconstruction distortion of the macroblock currMbAddr in the enhancement layer, if the sets of coding parameters $p_0$ to $p_{refLayer}$ have respectively been selected for the base layer and the enhancement layers already coded, and $R(p|p_{refLayer} \ldots p_0)$ represents the coding cost of the macroblock CurrMbAddr in the enhancement layer, if the sets of coding parameters $p_0$ to $p_{refLayer}$ have respectively been selected for the base layer and the enhancement layer is already coded.

Thus the algorithm in FIG. 7 performs a loop comprising steps 715 to 735 on all the possible coding parameters for the current macroblock, and selects the one that minimizes the Lagrangian of equation (9). In this way there are obtained firstly the optimum coding parameters for the current macroblock denoted $P_{opt}$ and secondly the reference data of the reference layer refLayer used for the prediction of the current macroblock, when the latter is coded with the coding parameters $P_{opt}$. These useful reference data are then taken into account in the process of separating the reference layer refLayer, detailed by the algorithm in FIG. 9.

More precisely, for each macroblock, during the first iteration of a step 720, that is to say for the first coding mode evaluated, a value Jmin is initialized to $J(p|p_{ref})$. During each following iteration of step 720 for this same macroblock, it is determined whether $J(p|p_{ref})<$Jmin. If so, during a step 725, Jmin is replaced by $J(p|p_{ref})$ and $P_{opt}$ takes the value p. Otherwise, or following step 725, it is determined whether the last coding mode to be evaluated has been evaluated. If not, during a step 735, the next coding mode to be evaluated is allocated to p.

If the result of step 730 is positive, during a step 740, the current macroblock is coded according to the optimum coding parameters $P_{opt}$ determined for the current macroblock.

During a step 745, it is determined whether the last macroblock to be coded in the current image has been coded. If not, during a step 750, the next macroblock of the current image is passed to and step 710 is returned to.

The algorithm in FIG. 7 ends when all the macroblocks of the current image have been coded, that is to say that when the result of step 745 is positive.

Figure 8:
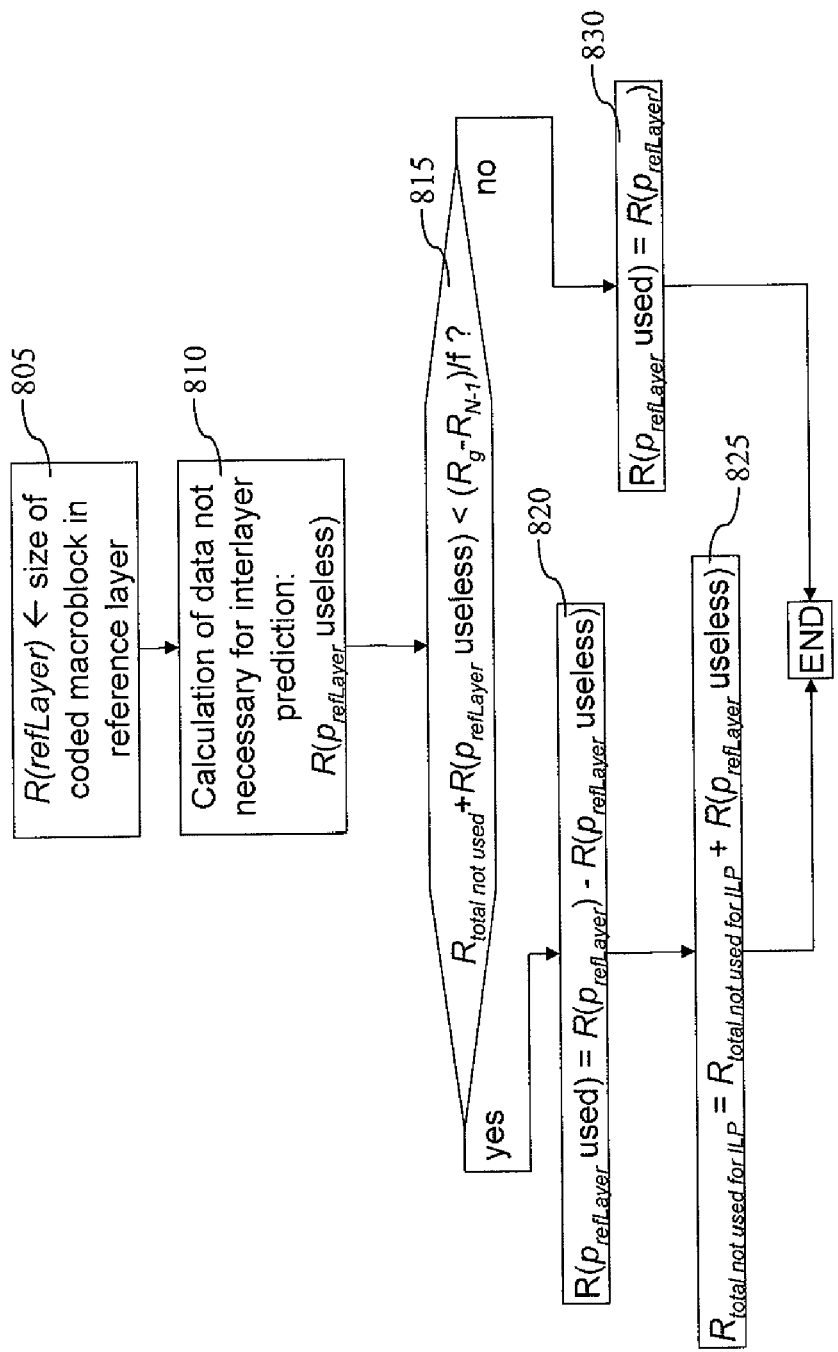

The algorithm in FIG. 8 details how the cost is calculated in terms of rate of the reference data used for a particular coding mode for a macroblock of the current image. More precisely, FIG. 8 details how the quantity $R(P_k$ used), with k=refLayer, of equation (9) is calculated. It should be noted that, for the values of k less than refLayer, the value $R(p_k$ used) has already been determined during the coding of the layers lower than the current layer. The inputs of the algorithm are as follows:

the coding mode in question p for the current macroblock in the scalability layer currently being coded, the maximum rate received by the various multicast clients $R_{N-1}$, which is also the rate corresponding to the SVC data necessary for decoding the last SVC layer to be coded, the bandwidth of the network link shared by all the multicast clients and greater than $R_{N-1}$: $R_g$, the image frequency of the coded video sequence: f, and the quantity of data coded for the current image, coming from the layers lower than the layer currently being coded, and which it has already been decided not to use for the interlayer prediction. This quantity is denoted $R_{total\ not\ used}$. It should be noted that, as already indicated by equation (5), the rate of the data not used for the interlayer prediction must remain less than the value $R_g - R_{N-1}$. In other words, if this rate is distributed evenly over the different images in the sequence, concerning the image currently being coded, the quantity of data not used in the interlayer prediction and separate from the useful data must not exceed the quantity $(R_g - R_{N-1})/f$.

The algorithm illustrated in FIG. 8 commences, during a step 805, with the calculation of the size of the coded macroblock in the reference layer corresponding to the macroblock currently being processed in the current layer by the algorithm in FIG. 7. This size is denoted $R(p_{refLayer})$.

Then, during a step 810, there is calculated, among the data coded by this reference macroblock, the quantity of data that are not necessary for the interlayer prediction, in the coding mode currently evaluated by the algorithm in FIG. 7. This is denoted $R(p_{refLayer}$ useless). During a step 815, it is determined whether the sum of this value and the quantity of data $R_{total\ not\ used}$ that have already been moved into the layers containing the data not used (see FIG. 5) is less than the constraint $(R_g - R_{N-1})/f$. If the result of step 815 is negative, this means that the rate necessary for moving the data not necessary for the interlayer prediction in a dedicated scalability layer is no longer available. The quantity $R(p_{refLayer}$ used) is then fixed so as to be equal to the size of the complete coded reference macroblock during a step 830.

If the result of step 815 is positive, during a step 820 it is possible to separate the coded data of the reference macroblock by moving the data necessary for the interlayer prediction into the dedicated scalability layer. The value $R(p_{refLayer}$ used) is then fixed at the size of the complete coded reference macroblock minus the size of the data unnecessary for the interlayer prediction:

$$R(p_{refLayer}\ \text{used}) = R(p_{refLayer}) - R(p_{refLayer}\ \text{useless}) \quad (10)$$

Finally, the total quantity of data moved into at least one dedicated scalability layer, since it is unnecessary for the interlayer prediction, is updated, during a step 825. The quantity of unnecessary data calculated for the reference macroblock in question is in fact added to it:

$R_{total\ not\ used}$ takes as its new value the previous $R_{total\ not\ used}$ to which $$R(p_{refLayer}\ \text{useless}) \text{is added} \quad (11)$$

Once the quantity $R(p_{refLayer}$ used) is determined, the algorithm in FIG. 8 ends and this value is returned to the algorithm in FIG. 7 (step 715).

The algorithm in FIG. 9 details the separation method employed in the preferred embodiment of the present invention. This method was briefly presented with regard to FIG. 5. The inputs of the algorithm in FIG. 9 are as follows:

the coding modes determined for the current image during the coding of the current image denoted currAU$_{currLayer}$ in the current scalability layer currLayer. The set of modes then determined is denoted.

{mbType[MbAddr],∀MbAddr∈currAU$_{currLayer}$}, the reference layer used for the interlayer prediction of the current layer: refLayer, the coded representation of the current image in the reference layer of the current layer: currAu$_{refLayer}$, and the coding modes decided in the image currAU$_{refLayer}$;

{ref LayerMbType[MbAddr],∀MbAddr∈currAU$_{currLayer}$}.

The algorithm runs through a loop comprising steps 910 to 945, on the macroblocks of the current image. During a step 905, the first macroblock of the current image is taken as a value of currMbAddr.

For each macroblock currMbAddr of the current image, during step 910, the corresponding macroblock is determined in the reference layer of the current layer. This is denoted refMbAddr. The next step of the algorithm, 915, consists of determining whether the macroblock thus found in the reference layer has been coded in INTRA. If so, during a step 920, the macroblock thus coded is kept entirely in the reference layer containing the data useful to the interlayer prediction of the current layer currLayer.

In the case where the macroblock refMbAddr is not coded in INTRA, during a step 925, it is determined whether the temporal residue interlayer prediction is used in the coding of the macroblock currMbAddr of the current layer. If this is the case, no separation of the coded data of the macroblock refMbAddr is carried out and the latter is kept fully in the reference layer refLayer. On the other hand, if the temporal residue interlayer prediction is not used in the coding of the macroblock currMbAddr, during a step 930 the motion data and the temporal residue data constituting the coded reference macroblock refMbAddr are separated. Next, during a step 935, the temporal residue coded in the macroblock refMbAddr is moved into the intermediate layer introduced into the coded SVC stream and intended to contain the coded data of the layer refLayer that are not used for the interlayer prediction of the current layer currLayer. These steps 930 and 935 correspond to the separation of the data already illustrated in FIG. 5.

Following one of steps 920, 925 or 935, during a step 940, it is determined whether the last macroblock of the current image has been processed. If not, during a step 945, the next macroblock to be processed is allocated to currMbAddr.

If the result of step 940 is positive, the algorithm in FIG. 9 ends.

The invention claimed is:

1. A video coding method comprising:
   (a) a step of obtaining at least two bandwidth values;
   (b) a step of coding a reference layer to create coded reference layer data, such that a rate of the coded reference layer data is less than or equal to a lowest bandwidth of the at least two bandwidth values;
   (c) a step of separating the reference layer into a first subset of data serving as a reference for an interlayer prediction of an enhancement layer, and a second subset of data that is not used for the interlayer prediction of the enhancement layer, each subset of data comprising less data than that of the entire reference layer,
   wherein, during said step of separating the reference layer:
      (i) inserting the second subset of data that is not used for the interlayer prediction in an intermediate layer, and keeping the first subset of data that is used for the interlayer prediction in the reference layer, and
      (ii) setting, in the intermediate layer, a syntax element of corresponding data to a value indicating that these data are discardable, and setting coded data of the enhancement layer to comprise a syntax element indicating that only the first subset of data of the reference layer that is used for the interlayer prediction of the enhancement layer is the reference layer obtained after the separation of the reference layer into the first subset of data and the second subset of data and the insertion of the second subset of data in the intermediate layer; and (d) at least one step of coding, for at least a first bandwidth greater than the lowest bandwidth, the enhancement layer to create a coded enhancement layer, such that a sum of a rate of data of the coded enhancement layer and a rate of the first subset of data is less than the first bandwidth greater than the lowest bandwidth.

2. A video coding method according to claim 1, wherein, during the step of obtaining at least two bandwidth values, further obtaining bandwidth values received by at least two coded video data destinations.

3. A video coding method according to claim 2, wherein the at least one step of coding the enhancement layer is a function of bandwidth of a link of a network shared by the destinations.

4. A video coding method according to claim 3, wherein, during the at least one step of coding the enhancement layer, an image reconstruction distortion is minimized while complying with the following two constraints:
the sum of the rate of the enhancement data during coding and the rate of the subset of data of the reference layer used for the interlayer prediction is less than or equal to a bandwidth received by a destination, and
a rate of all current data, including data unnecessary for the interlayer prediction, the data used for the interlayer prediction, and the data coded in the enhancement layer is less than or equal to the bandwidth of the link of the network shared by the destinations.

5. A video coding method according to claim 1, wherein, during said step of separating the reference layer, temporal residues are separated when they are not used as a predictor for residue interlayer prediction and are inserted in the intermediate layer.

6. A video coding method according to claim 1, wherein, during said step of separating the reference layer, the following are kept in the reference layer:
motion data comprising macroblock partitioning data and motion vector data,
reference data of reference image indices for temporal prediction, and
macroblocks coded in INTRA.

7. A video coding method according to claim 6, wherein, during said step of separating the reference layer, information indicating that the macroblocks are contained in the intermediate layer, and inherit motion data coded in the reference layer are added to the intermediate layer.

8. A video coding method according to claim 6, wherein, during said step of separating the reference layer, for each macroblock of a current layer, if a corresponding macroblock for the interlayer prediction, in the reference layer, has been coded in INTRA, the macroblock is kept in the reference layer.

9. A video coding method according to claim 8, wherein, during said step of separating the reference layer, if the macroblock of the reference layer has not been coded in INTRA, and if a temporal residue interlayer prediction is used in coding the macroblock of the current layer, the coded data of the macroblock is kept in the reference layer.

10. A video coding method according to claim 8, wherein, during said step of separating the reference layer, if the macroblock of the reference layer has not been coded in INTRA, and if a temporal residue interlayer prediction is not used in coding the macroblock of the current layer, coded data of the macroblock is inserted in the intermediate layer.

11. A video coding method according to claim 1, wherein, during said at least one step of coding the enhancement layer, selecting a coding parameter that minimizes a Langrangian of the form $J=D+\lambda \times R$, where D represents a reconstruction distortion, R represents the rate of the data serving as the reference for the interlayer prediction, and $\lambda$ represents a rate-distortion slope that is a function of the rate.

12. A video coding method according to claim 11, further comprising a step of calculating the rate of the data serving as the reference for the interlayer prediction, during which, account is taken of a total rate of the data used for a prediction of a current macroblock of the enhancement layer during coding, according to a candidate coding parameter for the minimization of the Lagrangian.

13. A video coding device comprising:
(a) a means for obtaining at least two bandwidth values;
(b) a means for coding a reference layer to create coded reference layer data, such that a rate of the coded reference layer data is less than or equal to a lowest bandwidth of the at least two bandwidth values;
(c) a means for separating the reference layer into a first subset of data serving as a reference for an interlayer prediction of an enhancement layer, and a second subset of data that is not used for the interlayer prediction of the enhancement layer, each subset of data comprising less data than that of the entire reference layer,
wherein, during the separating of the reference layer:
(i) the second subset of data that is not used for the interlayer prediction is inserted in an intermediate layer, and the first subset of data that is used for the interlayer prediction is kept in the reference layer, and
(ii) in the intermediate layer, a syntax element of corresponding data is set to a value indicating that these data are discardable, and coded data of the enhancement layer comprise a syntax element indicating that only the first subset of data of the reference layer that is used for the interlayer prediction of the enhancement layer is the reference layer obtained after the separation of the reference layer into the first subset of data and the second subset of data and the insertion of the second subset of data in the intermediate layer; and
(d) a means for coding, for at least a first bandwidth greater than the lowest bandwidth, the enhancement layer to create a coded enhancement layer, such that a sum of a rate of data of the coded enhancement layer and a rate of the first subset of data is less than the first bandwidth greater than the lowest bandwidth.

14. A video coding device according to claim 13, wherein the means for obtaining at least two bandwidth values is constructed to obtain bandwidth values received by at least two coded video data destinations, and at least one means for coding the enhancement layer is constructed to code the enhancement layer as a function of bandwidth of a link of a network shared by the destinations.

15. A video coding device according to claim 14, wherein at least one means for coding the enhancement layer is constructed to code the enhancement layer and to minimize an image reconstruction distortion while complying with the following two constraints:
the sum of the rate of the enhancement data during coding and the rate of the subset of data of the reference layer used for the interlayer prediction is less than or equal to a bandwidth received by a destination, and
a rate of all current data, including data unnecessary for the interlayer prediction, the data used for the interlayer prediction, and the data coded in the enhancement layer is less than or equal to the bandwidth of the link of the network shared by the destinations.

16. A non-transitory computer-readable storage medium storing a computer program able to be loaded into a computer system, said program containing instructions for implementing a video coding method according to claim 1.

17. A non-transitory information carrier able to be read by a computer or a microprocessor, removable or not, storing instructions of a computer program, that enables a video coding method according to claim 1 to be implemented.

* * * * *